(12) United States Patent
Bidermann et al.

(10) Patent No.: US 6,970,195 B1
(45) Date of Patent: Nov. 29, 2005

(54) DIGITAL IMAGE SENSOR WITH IMPROVED COLOR REPRODUCTION

(75) Inventors: William R. Bidermann, Mountain View, CA (US); David Xiao Dong Yang, Mountain View, CA (US)

(73) Assignee: Pixim, Inc., Mountain View, CA (US)

( * ) Notice: Subject to any disclaimer, the term of this patent is extended or adjusted under 35 U.S.C. 154(b) by 859 days.

(21) Appl. No.: 09/909,528

(22) Filed: Jul. 20, 2001

Related U.S. Application Data

(63) Continuation-in-part of application No. 09/567,786, filed on May 9, 2000.

(51) Int. Cl.[7] .................. H04N 5/335; H04N 5/235
(52) U.S. Cl. ................. 348/308; 348/302; 348/362
(58) Field of Search .................. 348/296, 297, 348/302, 304, 272, 273, 362, 308, 363, 301, 348/246, 247, 241, 216.1; 396/96; 250/208.1

(56) References Cited

U.S. PATENT DOCUMENTS

| | | | |
|---|---|---|---|
| 5,187,569 A * | 2/1993 | Tani | 348/277 |
| 5,237,185 A * | 8/1993 | Udagawa et al. | 257/204 |
| 5,461,425 A * | 10/1995 | Fowler et al. | 348/294 |
| 5,734,426 A * | 3/1998 | Dong | 348/297 |
| 5,943,514 A * | 8/1999 | Sato et al. | 396/96 |
| 6,229,113 B1 * | 5/2001 | Hynecek | 250/208.1 |
| 6,330,030 B1 * | 12/2001 | O'Connor | 348/297 |
| 6,665,010 B1 * | 12/2003 | Morris et al. | 348/297 |

FOREIGN PATENT DOCUMENTS

| | | | | |
|---|---|---|---|---|
| JP | 04313949 A | * | 11/1992 | H04N 1/04 |

* cited by examiner

*Primary Examiner*—David L. Ometz
*Assistant Examiner*—Lin Ye
(74) *Attorney, Agent, or Firm*—Carmen C. Cook; Patent Law Group LLP

(57) ABSTRACT

An image sensor includes a sensor array including a two-dimensional array of pixel elements. The array of pixel elements includes a first group of photodetectors having a first sensitivity level and a second group of photodetectors having a second sensitivity level. The sensor array outputs digital signals as pixel data representing an image of a scene. In operation, the first group of photodetectors generates the output signals after a first exposure time and the second group of photodetectors generates the output signals after a second exposure time, where the first exposure time and the second exposure time are within a snapshot of the scene and the first exposure time is different than the second exposure time. When thus operated, the image sensor of the present invention provides improved color reproduction capability and improved signal to noise ratio, especially for the less sensitive photosensitive elements.

14 Claims, 8 Drawing Sheets

DIGITAL IMAGE SENSOR WITH IMPROVED COLOR REPRODUCTION

CROSS-REFERENCE TO RELATED APPLICATION

This is a continuation-in-part of co-pending U.S. application Ser. No.: 09/567,786, entitled "Multiple Sampling via a Time-indexed Method to Achieve Wide Dynamic Ranges," filed on May 9, 2000 and by David Yang, et al., one of which is a co-inventor hereof. This application is related to U.S. application No.: 09/823,838, entitled "Method And Apparatus for Storing Image Information for Multiple Sampling Operations in a Digital Pixel Sensor," filed on Mar. 30, 2001, which is hereby incorporated by reference in its entirety.

BACKGROUND OF THE INVENTION

1. Field of the Invention

The invention relates to image sensor systems, and in particular, the present invention relates to an image sensor with improved color reproduction capability.

2. Description of the Related Art

Digital photography is one of the most exciting technologies that have emerged in the past years. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make digital cameras the hottest new category of consumer electronics products.

Most digital cameras use an image sensor or a photosensitive device, such as a charged-coupled device (CCD) or a Complementary Metal-Oxide Semiconductor (CMOS) device to sense a scene. The photosensitive device reacts to light reflected from the scene and can translate the strength of that reaction into electronic charging signals that are further digitized. Because the image is actually a collection of numeric data, the image data can easily be downloaded into a computer and manipulated for more artistic effects.

FIG. 1 illustrates an image sensor or photosensitive chip 100 which may be used in an image capturing device, such as a digital camera, for either stationary or video photography. Image sensor 100 produces digital image data representing the light intensity of the scene being captured. Image sensor 100 is typically fabricated on a single substrate, such as in a CMOS fabrication process, and includes a two-dimensional array of photosensitive devices, also referred to as photodetectors. The number of the photodetectors in image sensor 100 typically determines the resolution of digital images resulting therefrom. The horizontal resolution is a function of the number of photodetectors in a row 102, and the vertical resolution is a function of the number of photodetectors in a column 104.

Each of the photodetectors in an image sensor comprises a photosensor that produces an electronic signal when it is exposed to light. Generally, the photosensor is a photodiode or a photogate in a CMOS sensor. FIG. 2 illustrates an exemplary structure of a photodetector where a photodiode 120 is modeled as a current source 122 and a capacitor 124. When a reset signal is applied at a Reset terminal 130, the capacitor 124 is fully charged to nearly the Vcc voltage through an NMOS transistor 128. After capacitor 124 is fully charged, photodiode 120 is ready for light integration.

When photodetector 120 is exposed to light, photons from incident light 126, filtered through a filter 136, impinge upon photodetector 120 and cause a change in the conductivity of the photodetector which is represented as a change in the current flow of current source 122. Current source 122 discharges capacitor 124 at a rate dependent on the number of photons striking photodetector 120. The voltage across capacitor 124 is thus dependent on the total number of photons striking photodetector 120. An output voltage signal $V_{out}$ generated at output node 129, which is the voltage across capacitor 124, is indicative of the integrated light intensity between the time that transistor 128 is turned off and the time that light 126 incident on photodetector 120 is turned off or the time the readout process begins. An optional circuit 132 may be included to enhance the electronic signal $V_{out}$ to a desired level so that the output signal, i.e. the pixel charge signal, can be effectively coupled to the subsequent circuitry in the image sensor. The pixel charge signal is subsequently digitized to provide pixel data for the associated pixel corresponding to the pixel charge signal.

Image sensor 100 can be used in black-and-white imaging applications or it can be used in color imaging applications. Besides digital cameras, image sensor 100 can also be applied in scanners, photocopy machines or facsimile machines to capture an image of an object by scanning the object sequentially.

In the case of a black-and-while application or a monochrome application, image sensor 100 is an array of photosensitive devices without the color filters. Image sensor 100 generates an image comprising an array of pixel data, each pixel data being a numerical value representing the intensity of the incident light impinged upon a pixel in the image sensor. For example, the pixel data can have a value between 0 and 255 for representing the gray scale or the variations of the light intensity of the scene being captured.

For color applications, a mosaic of selectively transmissive filters is superimposed in registration with each of the photodetectors so that a first, second, and third selective group of photodetectors are made to sense three different color ranges, for example, the red, green, and blue range of the visible spectrum, respectively. As shown in FIG. 1, image sensor 100 includes red, green and blue filters for capturing the red, green and blue components of a scene. A group of red, green and blue pixels, such as a pixel 106 for capturing the red spectrum, a pixel 107 for capturing the green spectrum, and a pixel 108 for capturing the blue spectrum, is used to make up or compose a color pixel C(i, j) in a color image. Alternately, a color imaging system may include a beam splitter and separate image sensors, each disposed to separately capture a primary color component of the target image. A color pixel C(i, j) in such a color imaging system includes the corresponding or derived pixels in each of the three primary color images.

Each color pixel C(i, j) in a color image is a vector pixel that may be expressed as follows:

$$C(i, j) = [R(i, j)\ G(i, j)\ B(i, j)]^T$$

where (i, j) are coordinates of an image pixel in the image sensor and C refers to the color image or images captured and R, G and B represent the intensity values for each of the three color spectra. If a cluster S of corresponding pixels in the color images have an identical value, namely R(i, j)=G(i, j)<B(i, j), where (i, j) is within S, a spot in the target (a scene or an object) corresponding to the cluster S is colorless, i.e. the spot is visually somewhere from black to white. Conversely if the cluster S of the pixels in color images have different values, i.e. $R(i, j) \neq G(i, j) \neq B(i, j)$, the spot in the target corresponding to the cluster S is visually colorful. For example, a pure red, green or blue vector pixel are expressed as $C(i, j)=[255\ 0\ 0]^T$, $C(i, j)=[0\ 255\ 0]^T$, or $C(i, j)=[0\ 0\ 255]^T$, respectively. To ensure that a target scene or object can be exactly reproduced in a color image, the image sensor must be carefully controlled to produce color intensity values that can be combined to reproduce the colors of the target in the resultant color image.

In general, image sensors have different responses to different wavelengths of light due to the absorption properties of the underlying photodetectors. For instance, silicon sensors are more sensitive to red light than blue light. FIG. 3 illustrates response curves of an exemplary image sensor to the red, green and blue spectra. Red light has a shorter wavelength than blue light and can be more easily absorbed in most silicon sensors. The different response or sensitivities to the different light spectra in an image sensor can lead to undesirable image artifacts.

FIG. 4 illustrates the intensity curves for a red, green, and blue pixel captured by image sensor 100 at a predetermined exposure time. When the integrated light intensities of the three color pixels are captured at the same exposure time, undesirable result may occur due to the different sensitivity of the photodetectors to the different color spectra. For example, as illustrated in FIG. 4, because a silicon image sensor is more sensitive to red light than green or blue light, the red pixel may become saturated by a certain exposure time while the blue pixels have not yet integrated enough light at that same exposure time. That is, the photodetectors collecting red light may become over-exposed while those photodetectors collecting blue light may become underexposed. Previous techniques for compensating for the disparity in sensitivity levels involve stopping the light integration process when the image sensor detects that the red pixels have became saturated and then artificially saturating the blue and green color pixels. A color image thus captured may become distorted in color as the proportional ratio of each color components becomes misrepresented.

What is needed is an image sensor with improved color reproduction capability so that color images can be rendered accurately.

SUMMARY OF THE INVENTION

According to one embodiment of the present invention, an image sensor includes a sensor array including a two-dimensional array of pixel elements. The sensor array outputs digital signals as pixel data representing an image of a scene. The array of pixel elements includes a first group of photodetectors having a first sensitivity level and a second group of photodetectors having a second sensitivity level. In operation, the first group of photodetectors generates the output signals after a first exposure time and the second group of photodetectors generates the output signals after a second exposure time, where the first exposure time and the second exposure time are within a snapshot of the scene and the first exposure time is different than the second exposure time.

In another embodiment, an image sensor employs multiple sampling to capture an image of a scene. A different set of exposure times are assigned to each group of photodetectors having different sensitivity levels. The exposure times in each set of exposure times are chosen so that the signal to noise ratio is optimized for all groups of photodetectors.

When thus operated, the image sensor of the present invention provides improved color reproduction capability and improved signal to noise ratio, especially for the less sensitive photosensitive elements.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

According to the principles of the present invention, a digital image sensor uses sensitivity-dependent exposure control whereby different groups of photodetectors with different sensitivity levels are subjected to different amounts of exposure time. An image thus captured has improved signal to noise ratio (SNR). The sensitivity-dependent exposure control imaging method according to the present invention has particular applications in color applications where the image sensor includes photosensitive elements having different sensitivities to different color spectra. By using the sensitivity-dependent exposure control imaging method, a color image thus captured can have improved color accuracy and improved signal to noise ratio, especially for the less sensitive photosensitive elements.

The sensitivity-dependent exposure control imaging method of the present invention can be applied to digital image sensors. In the preferred embodiment, a digital pixel sensor is used. In other embodiments, the sensitivity-dependent exposure control imaging method can be practiced in a camera including separate imager sensors for each primary color component.

Figure 1:
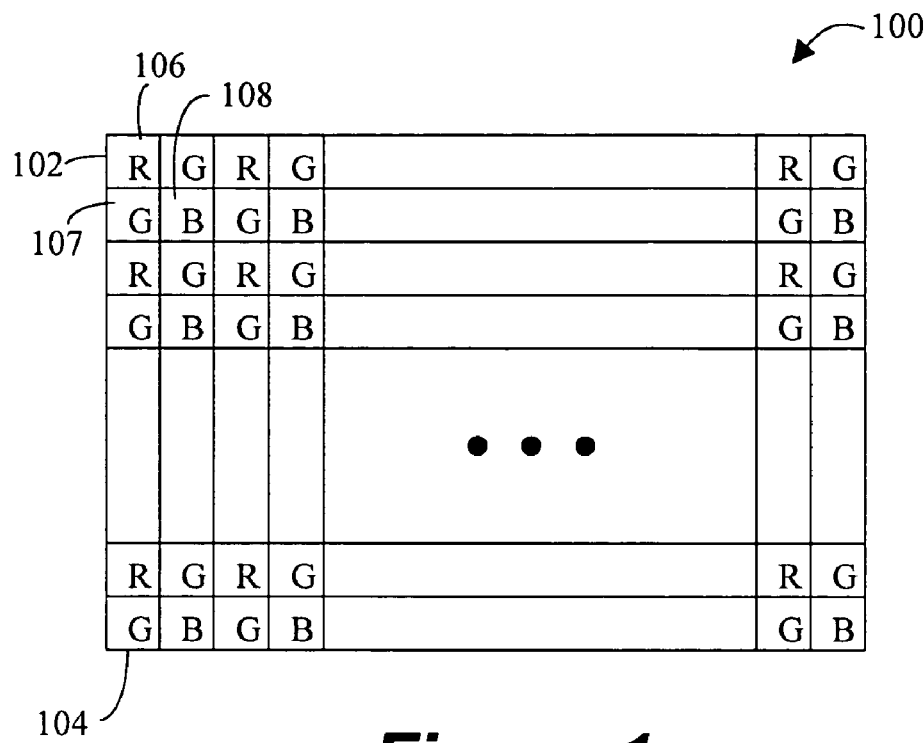
FIG. 1 illustrates an image sensor or photosensitive chip which may be used in an image capturing device.
Figure 2:
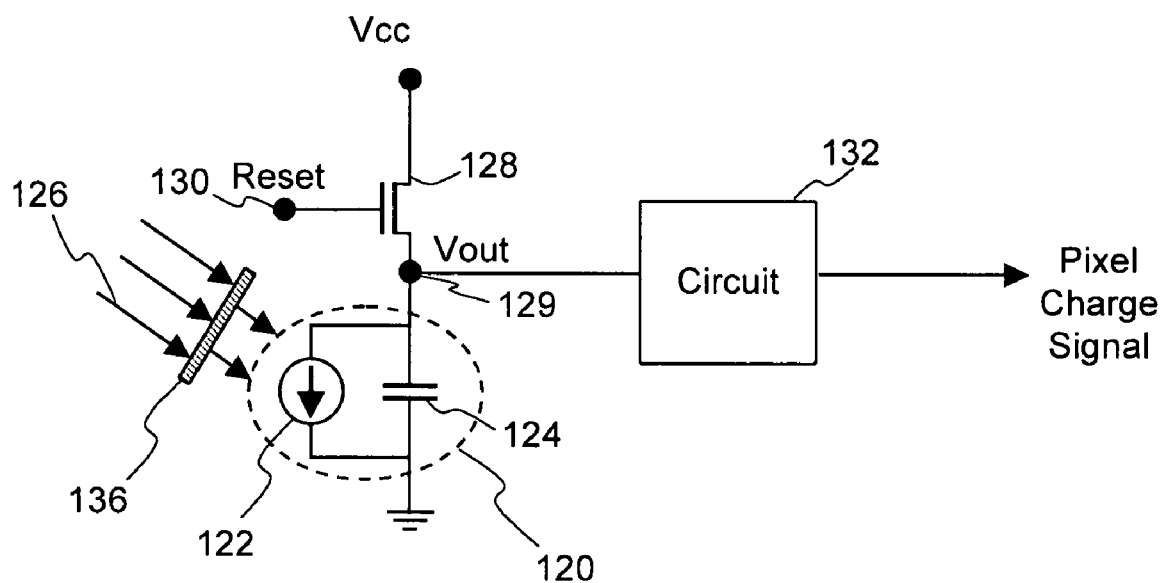
FIG. 2 illustrates an exemplary structure of a photodetector where a photodiode is modeled as a current source and a capacitor.

In one embodiment, the sensitivity-dependent exposure control imaging method is practiced in image sensor 100 of FIG. 1. As described above, for capturing a color image, image sensor 100 can include a mosaic of selectively transmissive filters superimposed and in registration with each of the photodetectors. As shown in FIG. 1, three types of color filters are provided to sense three different color ranges. In the present example, the red-green-blue (RGB) color space is used. Thus, a red filter overlies pixel 106, a green filter overlies pixel 107 and a blue filter overlies pixel 108. When thus configured, image sensor 100 includes three groups of photodetectors having different sensitivity level. For instance, the group of photodetectors disposed to detect the red spectrum is more sensitive than the groups disposed to detect the green and blue spectra. Furthermore, for typical image sensors, the group of photodetectors disposed to detect the blue spectrum is the least sensitive.

The sensitivity-dependent exposure control imaging method of the present invention can be applied to image sensor 100 for improving the color reproduction capability of the image sensor, despite the disparity in sensitivity levels among the photodetectors. In operation, image sensor 100 captures an image using different exposure times for each group of photodetectors with different sensitivity levels and the different exposure times are within a predetermined time for a snapshot of a scene. As used herein, the terms "exposure time" or "exposure" are used to refer to the time it takes to produce the output signals. In accordance with the present invention, the exposure time for each of the groups of photodetectors is confined within a snapshot of a scene. For example, if the time for a snapshot of a scene is set up to 1/120 second, one exposure time is stopped at 1/240 to prevent signals of a first group of photodetectors from being saturated while another exposure time is stopped at 1/120 to ensure sufficient exposure of a second group of photodetectors.

In general, the stronger the sensitivity level, the shorter the exposure time. Thus, at a first exposure time, the integrated light intensity collected by the group of red pixels (such as pixel 106) is readout. Then, at a second exposure time, the integrated light intensity collected by the group of green pixels (such as pixel 107) is readout. Finally, at a third exposure time, the integrated light intensity collected by the group of blue pixels (such as pixel 108) which are the least sensitive pixels, is readout. The sensitivity-dependent exposure control can be implemented in hardware in the control circuitry of image sensor 100. The sensitivity-dependent exposure control can also be implemented in software whereby instructions from a processor can be provided to image sensor 100 to control the exposure time and readout process of the image sensor.

In a preferred embodiment of the present invention, a digital pixel sensor (DPS) is used for practicing the color imaging method of the present invention. When a DPS sensor is used, pixel-level sensitivity-dependent exposure control can be applied to capture a color image with improved color accuracy and signal to noise ratio characteristics.

Figure 5:
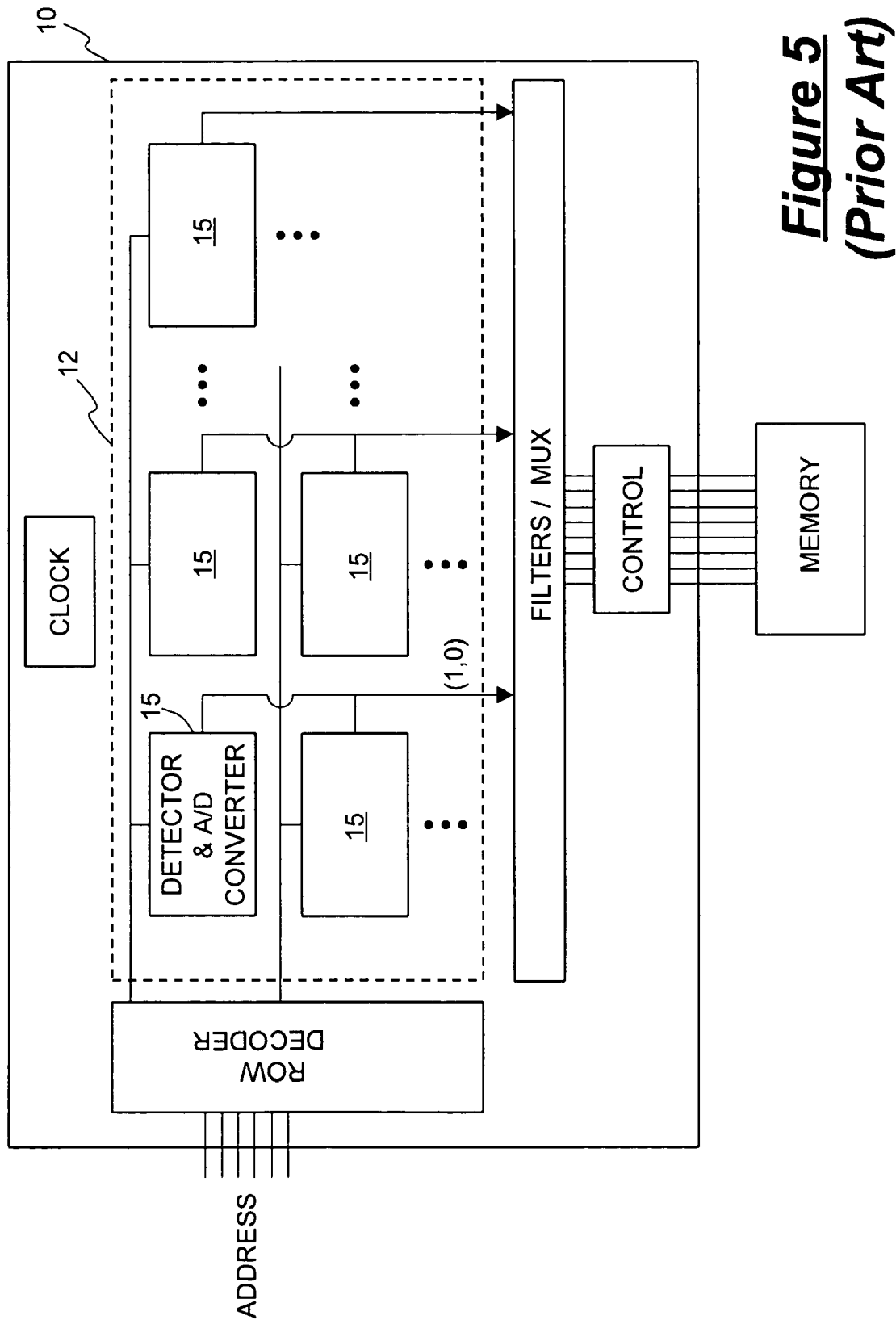
FIG. 5 illustrates the digital pixel sensor architecture used in the '425 patent which may be used to practice the color imaging method according to one embodiment of the present invention.

A CMOS image sensor with pixel level analog-to-digital conversion is described in U.S. Pat. No. 5,461,425 of B. Fowler et al. (the '425 patent), which reference is incorporated herein by reference in its entirety. FIG. 5 duplicates FIG. 1 of the '425 patent and illustrates the digital pixel sensor architecture used in the '425 patent which may be used to practice the color imaging method according to one embodiment of the present invention. In FIG. 5, image sensor 10 is referred to herein as a digital pixel sensor (DPS) which provides a digital output signal at each pixel element representing the light intensity detected by that pixel element. The combination of a photodetector and an analog-to-digital (A/D) converter in an area image sensor helps enhance detection accuracy and reduce power consumption, and improves overall system performance.

In the present description, a digital pixel sensor (DPS) array or a sensor array refers to a digital image sensor having an array of photodetectors where each photodetector produces a digital output signal. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 6:
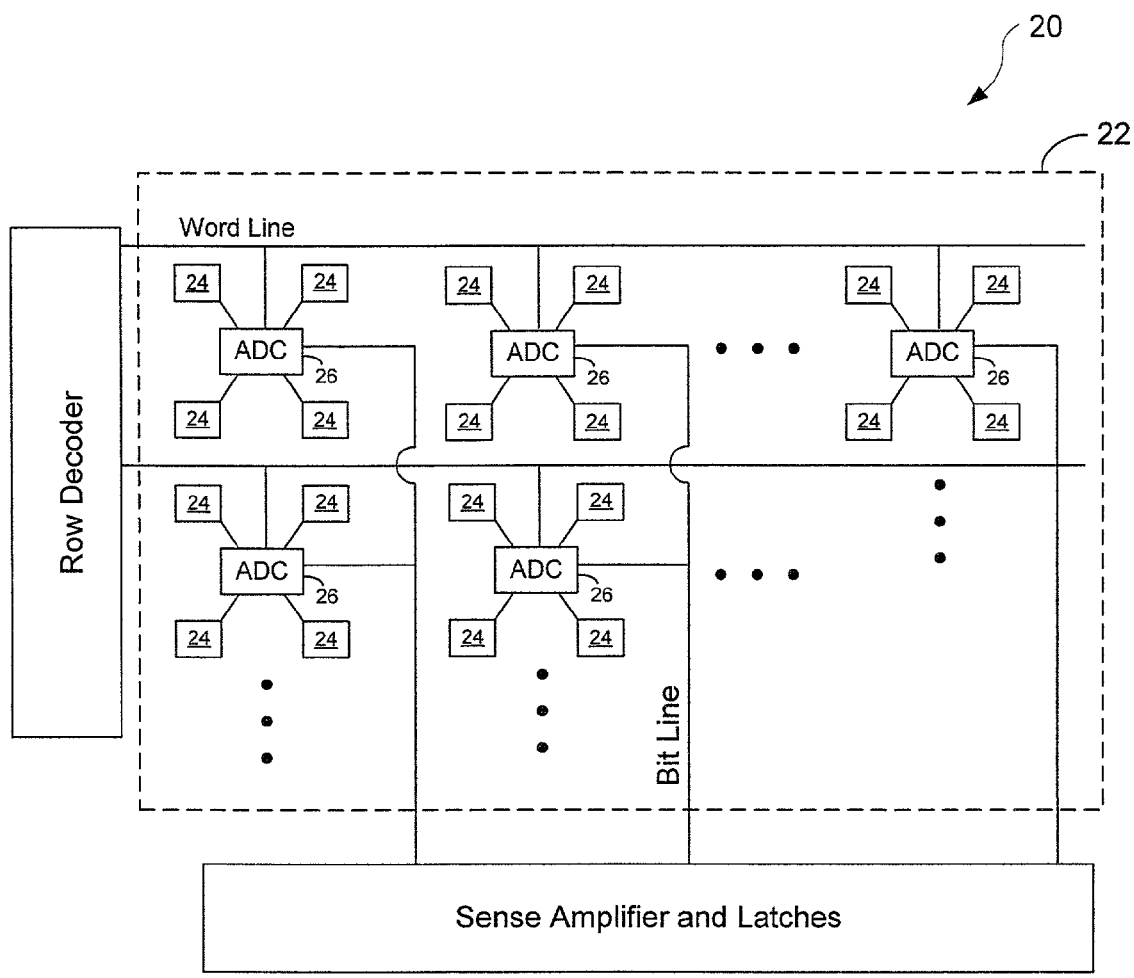
FIG. 6 is a block diagram of a digital image sensor where an A/D converter is associated with four photodetectors in an image sensor array.

In the digital pixel sensor architecture shown in FIG. 5, a dedicated ADC scheme is used. That is, each pixel element 15 in sensor array 12 includes an ADC circuit. The imaging method of the present invention can also be practiced in other DPS architectures, including a shared ADC scheme. In the shared ADC scheme, instead of providing a dedicated ADC circuit to each photodetector in a sensor array, an ADC circuit is shared among a group of neighboring photodetectors. FIG. 6 is a block diagram of a digital image sensor where an A/D converter is associated with four photodetectors in an image sensor array. In digital image sensor 20 of FIG. 6, sensor array 22 includes a two-dimensional array of photodetectors 24. Instead of providing a dedicated ADC circuit to each photodetector, an ADC circuit 26 is shared among a group of four neighboring photodetectors 24. Each of the ADC circuit 26 performs A/D conversion of the output voltage signal by multiplexing between the four neighboring photodetectors. Although the image capture time becomes four times longer in the shared-ADC architecture of FIG. 6 than the dedicated-ADC architecture of FIG. 5, the shared-ADC architecture of FIG. 6 has the advantage of retaining the benefits of pixel level analog-to-digital conversion while using a much smaller circuit area, thus reducing manufacturing cost and improving yield. The shared-ADC architecture is also described in "A 640×512 CMOS Image Sensor with Ultrawide Dynamic Range Floating-Point Pixel-Level ADC," by David X. D. Yang et al., IEEE Journal of Solid-State Circuits, Vol. 34, No. 12, December 1999, p. 1821–1834, which reference is incorporated by reference in its entirety.

In one embodiment of the present invention, the ADC circuit of each digital pixel or each group of digital pixel is implemented using the Multi-Channel Bit Serial (MCBS) analog-to-digital conversion technique described in U.S. Pat. No. 5,801,657 of Fowler et al. The MCBS ADC technique of the '657 patent can significantly improve the overall system performance while minimizing the size of the ADC circuit. Furthermore, as described in the '657 patent, an MCBS ADC has many advantages applicable to image acquisition and more importantly, facilitates high-speed readout. U.S. patent application Ser. No. 09/274,202 provides alternative ADC mechanisms that can significantly improve the overall system performance while minimizing the size of the A/D converters. Finally, copending and commonly assigned U.S. patent application Ser. No. 09/823,443 describes a multiplexed multi-channel bit serial ADC which may be advantageously applied to a DPS image sensor implementing a shared ADC architecture. The aforementioned patent and patent applications are incorporated herein by reference in their entireties.

Copending and commonly assigned U.S. patent application Ser. No. 09/567,638, entitled "Integrated Digital Pixel Sensor Having a Sensing Area and a Digital Memory Area" of David Yang et al., describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range without many of the disadvantages associated with other dynamic range enhancement techniques, such as degradation in signal-to-noise ratio and increased implementation complexity. The aforementioned patent application is incorporated herein by reference in its entirety.

According to one embodiment of the present invention, the sensitivity-dependent exposure control imaging method of the present invention is implemented using the DPS architecture of FIG. 5. In a DPS architecture, independent exposure control can be realized by controlling the readout process on a pixel-by-pixel basis.

According to an alternate embodiment of the present invention, the sensitivity-dependent exposure control imaging method of the present invention is implemented using the shared-ADC DPS architecture of FIG. 6. In particular, the shared-ADC architecture can be applied advantageously in the imaging method of the present invention by arranging pixels with different sensitivity levels to share one ADC circuit. For example, the 4-to-1 shared ADC architecture of FIG. 6 can be used to sense the Cyan, Magenta, Yellow and Green (CMYG) color space. Thus, the four pixels 24 sharing one ADC circuit 26 can be disposed to sense a cyan color, a magenta color, a yellow color and a black color each. Each of cyan, magenta, yellow and black color pixels is read out at a different exposure time than the other color pixels. Thus, when the four color pixels share one ADC circuit, the multiplexing between the four color pixels can be implemented according to the exposure times of each color pixel. In this manner, the shared-ADC architecture can be advantageously applied to save circuit space while improving color reproduction capability. Of course, the shared-ADC architecture can also be used for capturing color images using the RGB color space.

The parent application (U.S. patent application Ser. No. 09/567,786, hereinafter "the '786 application") describes a method for facilitating image multiple sampling using a time-indexed approach. In a preferred embodiment of the present invention, the sensitivity-dependent exposure control imaging method practices multiple sampling for improving the sensitivity range of the photodetectors while improving the color accuracy of the image.

Figure 3:
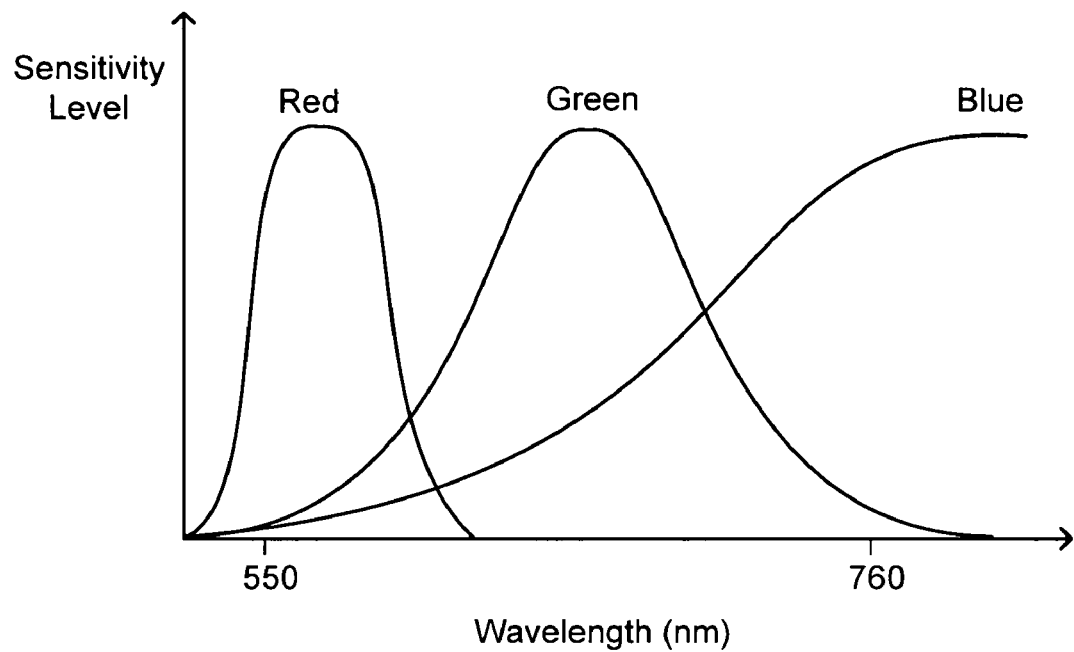
FIG. 3 illustrates response curves of an exemplary image sensor to the red, green and blue spectra.
Figure 4:
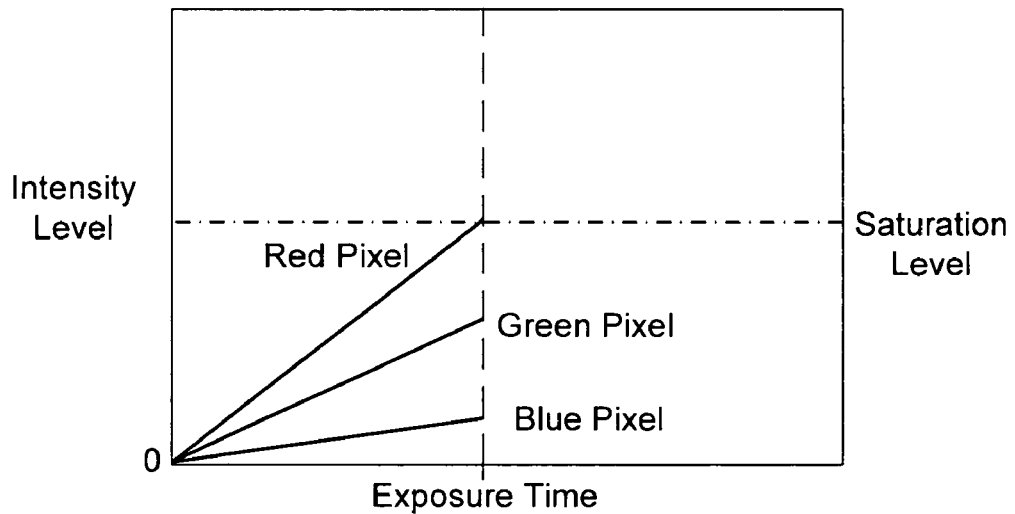
FIG. 4 illustrates the intensity curves for a red, green, and blue pixel captured by the image sensor of FIG. 1 at a predetermined exposure time.
Figure 7:
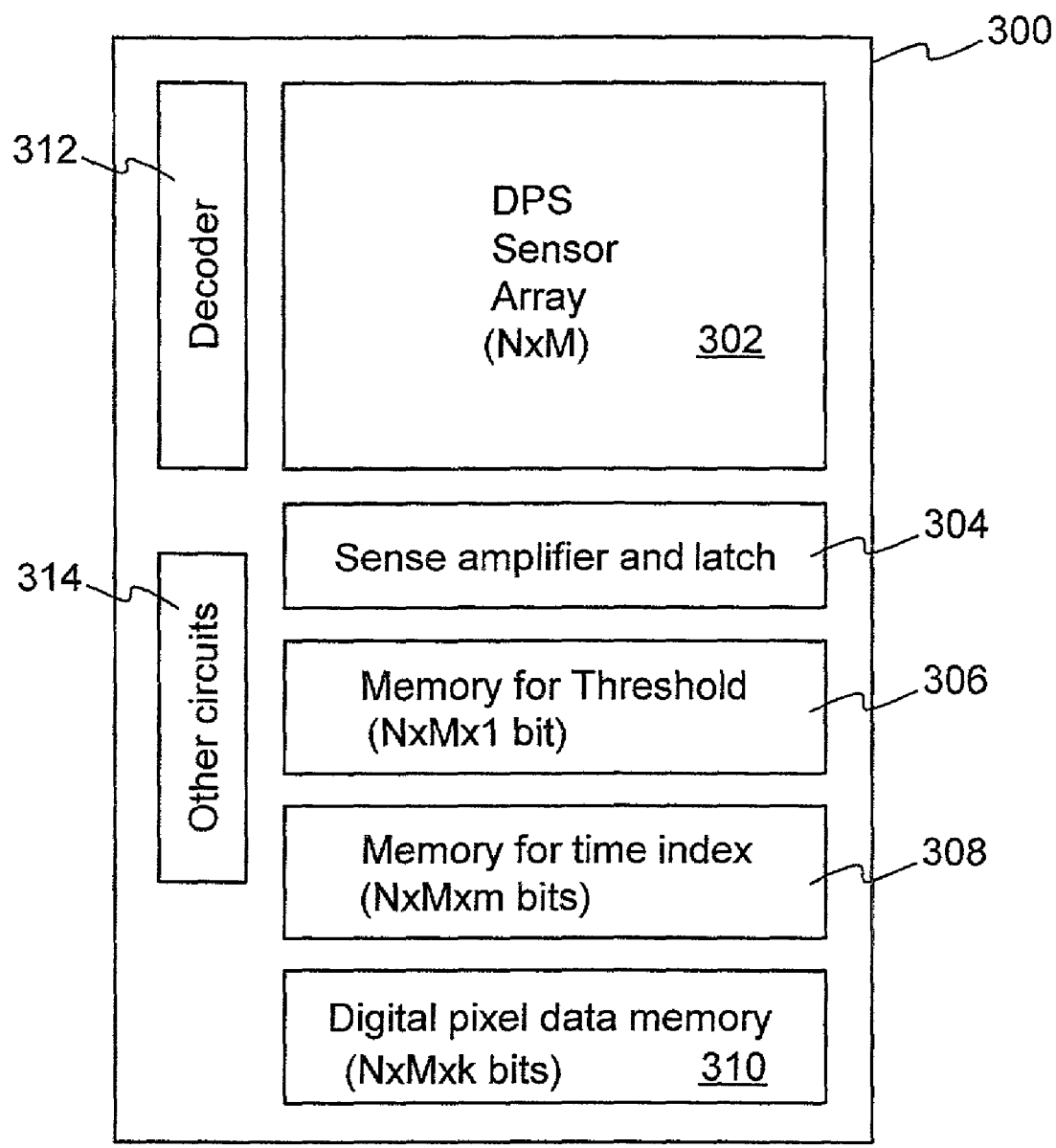
FIG. 7 shows a functional block diagram of an image sensor which may be used to practice the color imaging method according to one embodiment of the present invention.

FIG. 7 duplicates FIG. 3 of the '786 patent application and shows a functional block diagram of an image sensor 300 which may be used to practice the color imaging method according to one embodiment of the present invention. The operation of image sensor 300 using multiple sampling is described in detail in the '786 patent application. Image sensor 300 includes a DPS sensor array 302 which has an N by M array of pixel elements. Sensor array 302 employs either the sensor architecture shown in FIG. 5 or FIG. 6 and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information of each pixel indicating whether the light intensity value measured by each pixel in sensor array 302 has passed a predetermined threshold level. In this example, the information is stored as a one-bit threshold indicator bit. The exposure time indicating when the light intensity measured by each pixel has passed the threshold level is stored in time index memory 308. In this example, the time index value is a two-bit value identifying each time exposure. As a result of this memory configuration, each pixel element in sensor array 302 can be individually time-stamped by threshold memory 306 and time index memory 308 and stored in digital pixel data memory 310.

Figure 8:
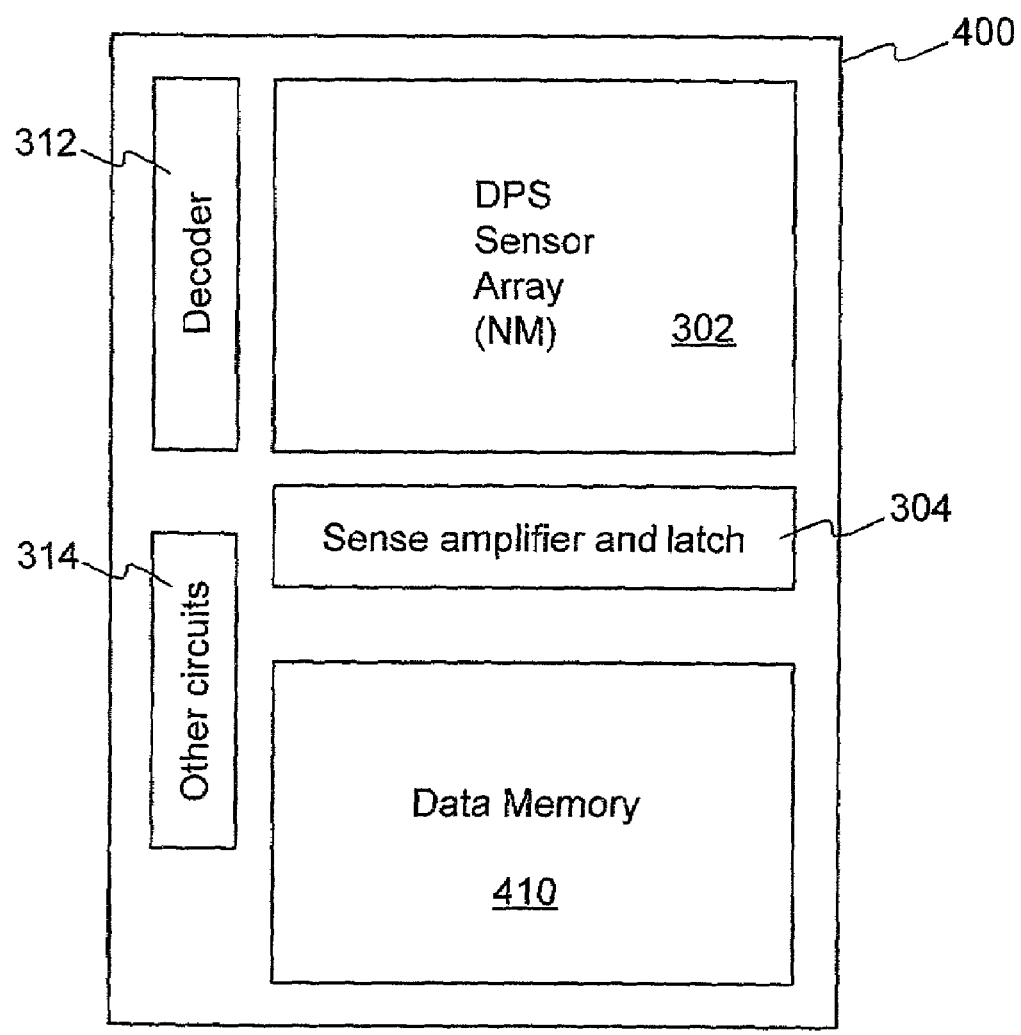
FIG. 8 shows a functional block diagram of an image sensor which may be used to practice the color imaging method according to another embodiment of the present invention.
Figure 9A:
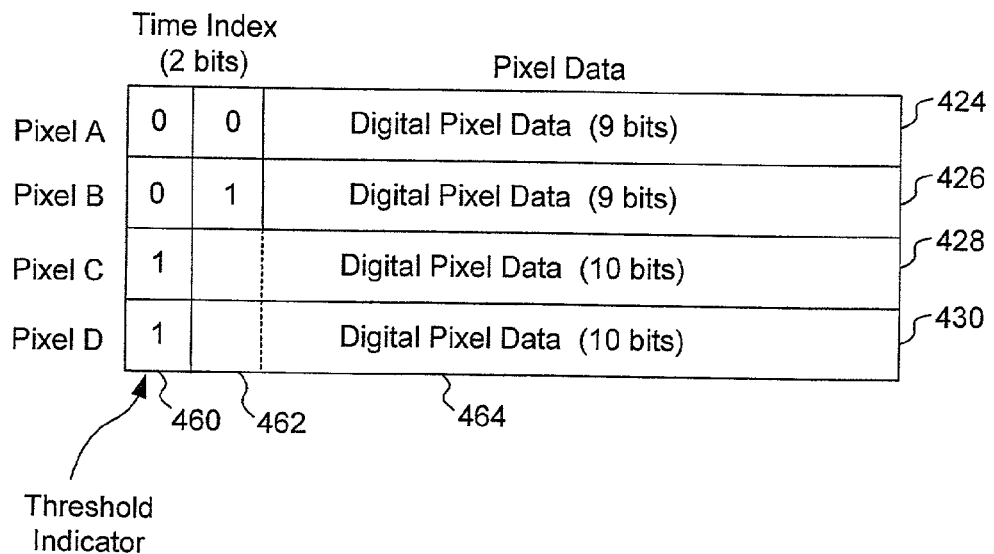
FIG. 9A illustrates four rows of exemplary memory cells in a data memory used to store image information according to one embodiment of the present invention.
Figure 9B:
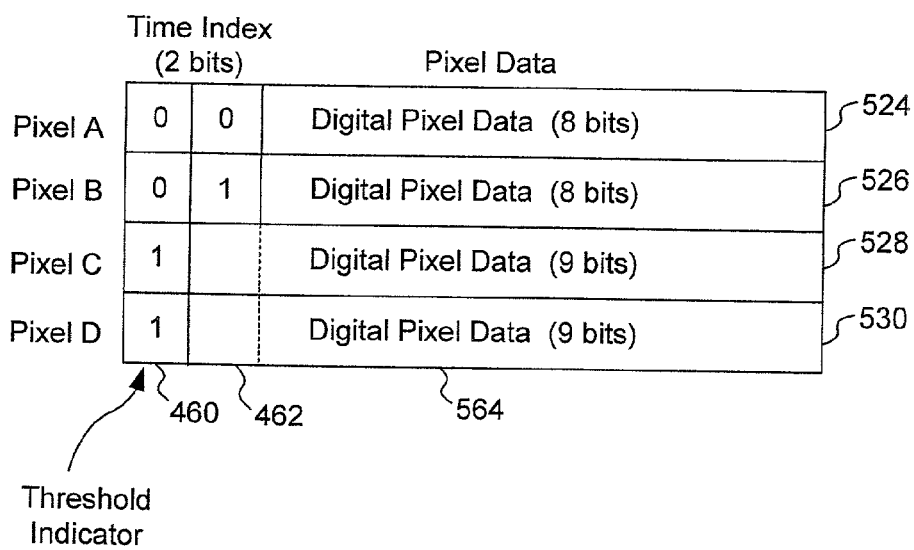
FIG. 9B illustrates four rows of exemplary memory cells for storing image information according to another embodiment of the present invention.

FIG. 8 duplicates FIG. 5 of the '838 patent application and shows a functional block diagram of an image sensor 400 which may be used to practice the color imaging method according to another embodiment of the present invention. The operation of image sensor 400 using multiple sampling is described in detail in the '838 patent application. Furthermore, image sensor 400 may employ the image information storage method for facilitating multiple sampling as described in the '838 patent application. FIGS. 9A and 9B illustrate memory configuration which can be used in memory 410 for implementing the image information storage method in accordance with embodiments of the present invention.

With the memory configuration outlined above and illustrated in FIG. 8, image sensor 400 can implement multiple sampling to improve the quality of an image. In multiple sampling, each pixel element is exposed to a target image for two or more different exposure times in order to compensate for bright and dark portions of the image. Additionally, the information regarding the exposure time associated with each pixel and the integrated intensity for that pixel is stored in memory 410 for use in computing the simulated pixel intensity when needed.

Figure 10:
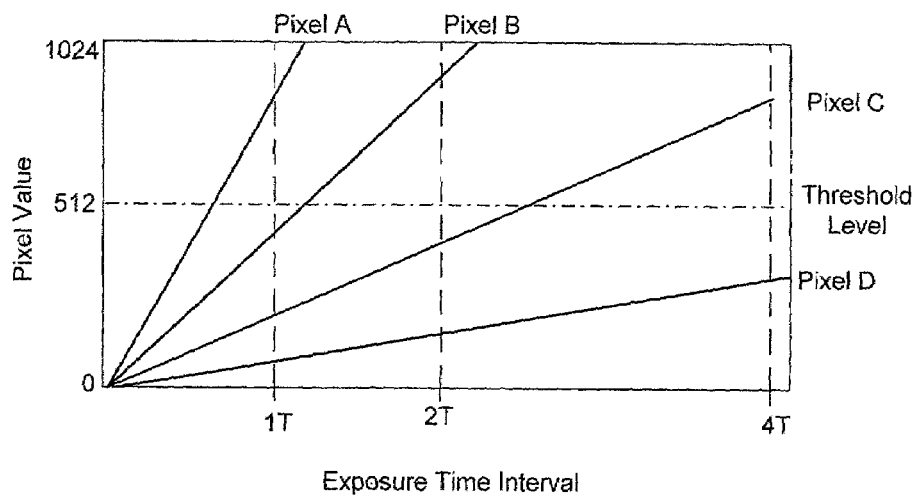
FIG. 10 illustrates the pixel intensity values vs. exposure time for four representative pixels A, B, C and D as detected by the DPS array of the image sensor in FIG. 8.

FIG. 10 illustrates the pixel intensity values vs. exposure time for four representative pixels A, B, C and D as detected by DPS array 302. FIG. 10 illustrates the multiple sampling operation where one set of exposure times (1T, 2T and 4T) is used for all the pixels in DPS array 302. In color applications, DPS array 302 may include a mosaic of red, green and blue color filters superimposed on the sensor array and in registration with each of the photodetectors. Therefore, in color applications, pixels A, B, C and D may represent pixels in different color groups of photodetectors.

In the multiple sampling operation of FIG. 10, pixel values are first read out at an exposure time 1T and a multiple sampling logic circuit in image sensor 400 performs a threshold comparison operation on the pixel values. The threshold comparison operation can be implemented in a variety of ways. In the present example, a 50% threshold level is used. Thus, at time 1T, the multiple sampling logic circuit of image sensor 400 compares the pixel values readout from each pixel element of DPS array 302 and determines which of the pixel intensity values exceeds the 50% threshold level. For example, in FIG. 10, pixel A has an intensity value exceeding the 50% threshold level while pixels B to D have intensity values below the threshold level. Pixel data for pixel A is recorded in data memory 410. The pixel data value and the time index value for pixel A will be used by image sensor 400 to derive the resultant intensity value of pixel A. The multiple sampling process continues with sensor readout being taken after exposure times of 2T and 4T where the time 4T is the last exposure time and represents one snapshot of the scene. Each time the pixel intensity value of a pixel exceeds the 50% threshold level, the threshold indicator bit of the associated pixel is set and the associated time index for that pixel is stored in the time index memory 308. The measured digital pixel values are stored in pixel data memory 410.

When pixels A, B, C and D represent pixels of different color groups (e.g., the RGB color space), pixel A may represent the intensity level of a red pixel while pixel D may represent the intensity level of a blue pixel. As described above, because a typical silicon image sensor has poor sensitivity to blue light, the blue pixels may need to be integrated for an exposure time much longer than the red pixels in order to acquire sufficient signals values to give a satisfactory signal to noise ratio. When all of the pixels are exposed to the same set of exposure times as in FIG. 10, it is very difficult to optimize the signal to noise ratio for different color pixels with different sensitivity levels.

In accordance with another embodiment of the present invention, the sensitivity-dependent exposure control imaging method can also be applied to image sensor 400 of FIG. 8 employing multiple sampling to enhance the dynamic range of the image sensor. Thus, DPS sensor array 302 of FIG. 8 may include groups of photodetectors having different sensitivity levels. For example, the groups of photodetectors can be disposed to detect different color spectrum of the visible light, such as the RGB color space. When multiple sampling is applied, a different set of exposure times are assigned to each group of photodetectors. The exposure times are selected according to the sensitivity level of that group of photodetectors. Thus, the multiple sampling operation is performed by using multiple sets of exposure times, each group of photodetectors is sampled by its associated set of exposure times. For example, if the group of photodetectors is disposed to sense a red color, the sensitivity level of the photodetectors is strong and the set of exposure times used may be shorter. On the other hand, if the group of photodetectors is disposed to sense a blue color, the sensitivity level of the photodetectors is weak and the set of exposure times used may be longer.

Figure 11:
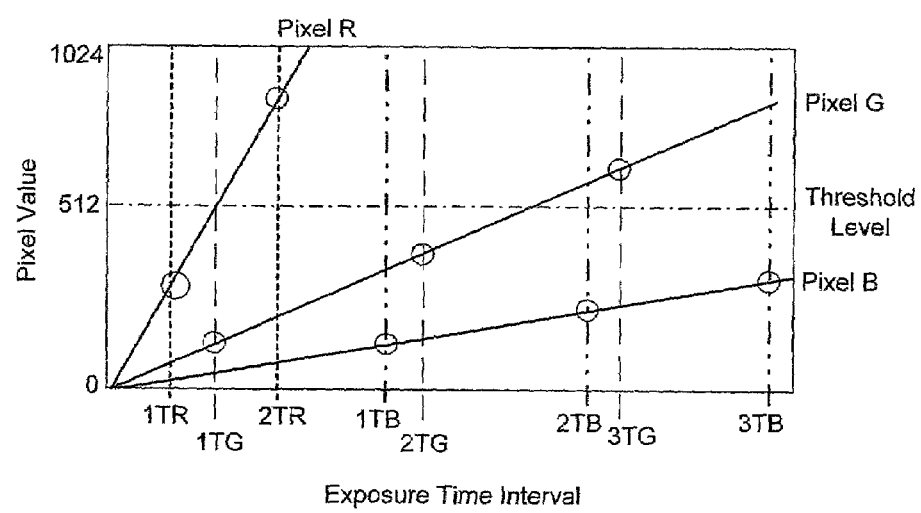
FIG. 11 illustrates three sets of exposure times as applied to three representative color pixels R, G and B for sensing the red, green and blue color spectra of the visible light according to one embodiment of the present invention.

FIG. 11 illustrates three sets of exposure times as applied to three representative color pixels R, G and B for sensing the red, green and blue color spectra of the visible light according to one embodiment of the present invention. FIG. 11 illustrates the use of multiple sets of exposure times for performing multiple sampling in an image sensor including groups of photodetectors with different sensitivity level. Referring to FIG. 11, the red pixel R is being sampled at exposure times 1TR and 2TR, the green pixel G is being sampled at exposure times 1TG, 2TG and 3TG, and the blue pixel B is being sampled at exposure times 1TB, 2TB and 3TB. All of the exposure times are within a snapshot of a scene. The exposure times are chosen so that the signal to noise ratio is optimized for all groups of photodetectors. For instance, because the red pixels have stronger sensitivity level, the red pixel R can become saturated sooner than the green or blue pixels. Thus, the set of exposure times for the red pixels can be selected to be earlier in the snapshot period.

On the other hand, because the blue pixels have weaker sensitivity level, the set of exposure times for the blue pixels can be selected to be later in the snapshot period so that the blue pixels can be given longer time to integrate the incident light intensity. In the example shown in FIG. 11, the first exposure time for the blue pixel is chosen to be after the last exposure time for the red pixel. In this manner, the light intensity level for the red pixels can be captured before the red pixels become saturated due to overexposed while the light intensity level for the blue pixels can be exposed for a longer period of time to provide enough integration so that the resultant light intensity values have improved signal to noise ratio.

Of course, FIG. 11 is illustrative only and other configurations of exposure times are possible to achieve the desired color reproduction characteristics and the desired signal to noise ratio. Furthermore, the exposure times within a set of exposure times do not have to be linearly spaced. The exposure times can be non-linearly spaced to achieve the desired result. For example, for sensing the weak sensitivity elements, the exposure times in the beginning can be more sparsely spaced than the exposure times at the end of the snapshot period.

In another embodiment, the sensitivity-dependent exposure control imaging method of the present invention is applied to an imaging system, such as a high-end camera, employing multiple image sensors to collect different color components of an image separately. Sensitivity-dependent exposure control can be provided by controlling the exposure time of each image sensor independently to equalize the different sensitivity level of each image sensor as described above.

Furthermore, the sensitivity-dependent exposure control imaging method of the present invention can be applied to image sensors having photodetectors with any types of sensitivity variations. In the above descriptions, the different sensitivity levels are derived from color filters (such as RGB filters or CMYG color filters). However, the imaging method of the present invention can also be applied in an image sensor regardless of the cause of the sensitivity variations in the image sensor, as long as the sensitivity variations can be quantified.

The above detailed descriptions are provided to illustrate specific embodiments of the present invention and are not intended to be limiting. Numerous modifications and variations within the scope of the present invention are possible. The present invention is defined by the appended claims.

We claim:

1. An image sensor, comprising:
a sensor array comprising a two-dimensional array of photodetectors and a plurality of analog-to-digital (A/D) converters forming a two-dimensional array of pixel elements, each pixel element comprising a photodetector and at least a portion of an A/D converter, each of the pixel elements outputting digital signals as pixel data representing an image of a scene, wherein each A/D converter in the sensor array is connected to a group of at least two neighboring photodetectors for receiving analog output signals from the group of photodetectors, each A/D converter multiplexing between the photodetectors in the group to convert the analog output signals of the photodetectors into digital signals as the pixel data associated with the photodetectors;

each group of photodetectors connected to an A/D converter comprising a first photodetector having a first sensitivity level and a second photodetector having a second sensitivity level, all of the first photodetectors in the sensor array forming a first set of photodetectors having the first sensitivity level and all of the second photodetectors in the sensor array forming a second set of photodetectors having the second sensitivity level;

wherein the first set of photodetectors having the first sensitivity level generates the analog output signals after a first exposure time and the second set of photodetectors having the second sensitivity level generates the analog output signals after a second exposure time different than the first exposure time, the first exposure time and the second exposure time being within a snapshot of the scene; and the A/D converters multiplex between the first and second photodetectors in the groups according to the first and second exposure times.

2. The image sensor of claim 1, wherein the second sensitivity level is lower than the first sensitivity level and the second exposure time is longer than the first exposure time.

3. The image sensor of claim 1, wherein the first set of photodetectors is disposed to capture a first color spectrum of visible light and the second set of photodetectors is disposed to capture a second and different color spectrum of visible light.

4. The image sensor of claim 3, further comprising:
a two dimensional array of selectively transmissive filters superimposed and in registration with each of the pixel elements, the array of selectively transmissive filters includes a first set of filters associated with the first set of photodetectors for capturing the first color spectrum of visible light and a second set of filters associated with the second set of photodetectors for capturing the second color spectrum of visible light.

5. The image sensor of claim 4, wherein each group of photodetectors connected to an A/D converter further comprises a third photodetector having a third sensitivity level, all of the third photodetectors in the sensor array forming a third set of photodetectors having the third sensitivity level the third set of photodetectors generating the analog output signals after a third exposure time different than the first and the second exposure times.

6. The image sensor of claim 5, wherein the first, second and third set of photodetectors are disposed to capture a red, green and blue color spectrum respectively.

7. The image sensor of claim 5, wherein the first, second and third groups of photodetectors are disposed to capture a cyan, magenta and yellow color spectrum respectively.

8. An image sensor, comprising:
a sensor array comprising a two-dimensional array of photodetectors and a plurality of analog-to-digital (A/D) converters forming a two-dimensional array of pixel elements, each pixel element comprising a photodetector and at least a portion of an A/D converter, each of the pixel elements outputting digital signals as pixel data representing an image of a scene, the sensor array generating multiple representations of the image at a plurality of exposure times, wherein each A/D converter in the sensor array is connected to a group of at least two neighboring photodetectors for receiving analog output signals from the group of photodetectors, each A/D converter multiplexing between the photodetectors in the group to convert the analog output signals of the photodetectors into digital signals as the pixel data associated with the photodetectors;

each group of photodetectors connected to an A/D converter comprising a first photodetector having a first sensitivity level and a second photodetector having a second sensitivity level, all of the first photodetectors in the sensor array forming a first set of photodetectors having the first sensitivity level and all of the second photodetectors in the sensor array forming a second set of photodetectors having the second sensitivity level;

a data memory, in communication with the sensor array, for storing a time index value and the pixel data for each of the pixel elements, the time index value indicating one of the plurality of exposure times in which the pixel data exceeds a predetermined threshold level and for which the pixel data is stored, wherein the plurality of exposure times comprises a first set of exposure times and a second set of exposure times, the first set of photodetectors generates the multiple representations of the image at the first set of exposure times, and the second set of photodetectors generates the multiple representations of the image at the second set of exposure times, the first set of exposure times and the second set of exposure times being within a snapshot of the scene and the first set of exposure times including at least one exposure time different than the second set of exposure times; and the A/D converters multiplex between the first and second photodetectors in the groups according to the first and second sets of exposure times.

9. The image sensor of claim 8, wherein the data memory further stores a threshold indicator value for each of the pixel elements indicating whether the pixel data for each of the pixel elements has exceeded the predetermined threshold level.

10. The image sensor of claim 8, wherein the second sensitivity level is lower than the first sensitivity level, and a last exposure time in the second set of exposure times is longer than a last exposure time of the first set of exposure times.

11. The image sensor of claim 8, wherein the first set of photodetectors is disposed to capture a first color spectrum of visible light and the second set of photodetectors is disposed to capture a second and different color spectrum of visible light.

12. The image sensor of claim 11, farther comprising:
a two dimensional array of selectively transmissive filters superimposed and in registration with each of the pixel elements in the sensor array, the array of selectively transmissive filters includes a first set of filters associated with the first set of photodetectors for capturing the first color spectrum of visible light and a second set of filters associated with the second set of photodetectors for capturing the second color spectrum of visible light.

13. The image sensor of claim 8, wherein the exposure times within the first set of exposure times are spaced apart in a non-linear manner.

14. The image sensor of claim 8, wherein the exposure times within the second set of exposure times are spaced apart in a non-linear manner.

* * * * *